INVENTOR.
ROBERT L. ARTHUR
BY James M. Abbott
ATTY

July 10, 1951  R. L. ARTHUR  2,559,840
ICE CREAM DISPENSER
Filed April 6, 1946  7 Sheets-Sheet 5
Fig. 6
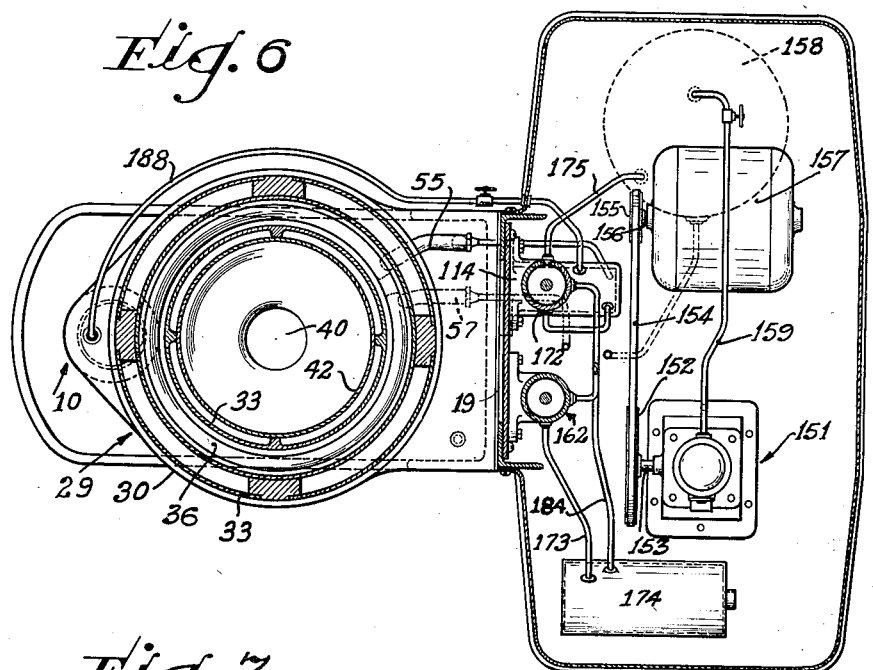
Fig. 7
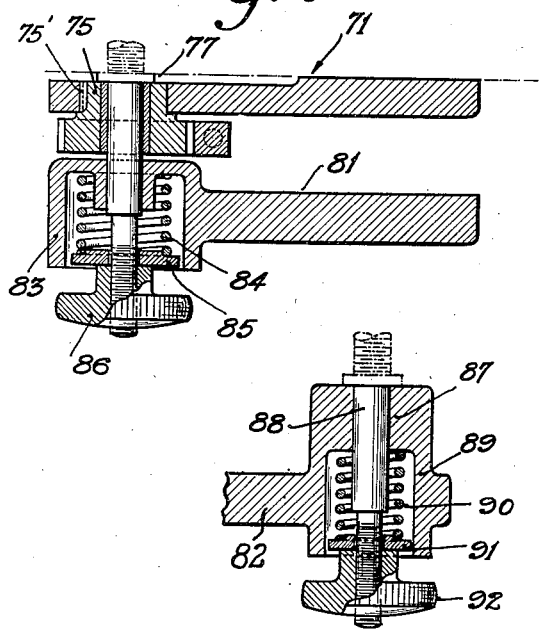
Fig. 9
Fig. 8
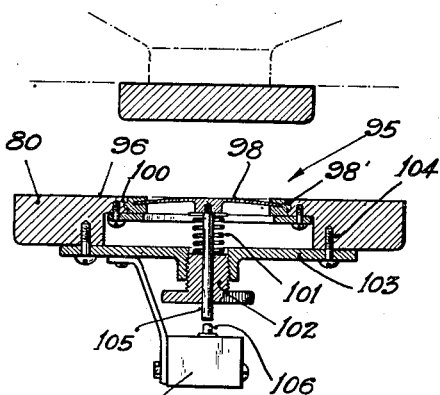
INVENTOR.
ROBERT L. ARTHUR
BY James M. Abbott
ATTY July 10, 1951  R. L. ARTHUR  2,559,840
ICE CREAM DISPENSER
Filed April 6, 1946  7 Sheets-Sheet 6

INVENTOR.
ROBERT L. ARTHUR
BY
ATTY

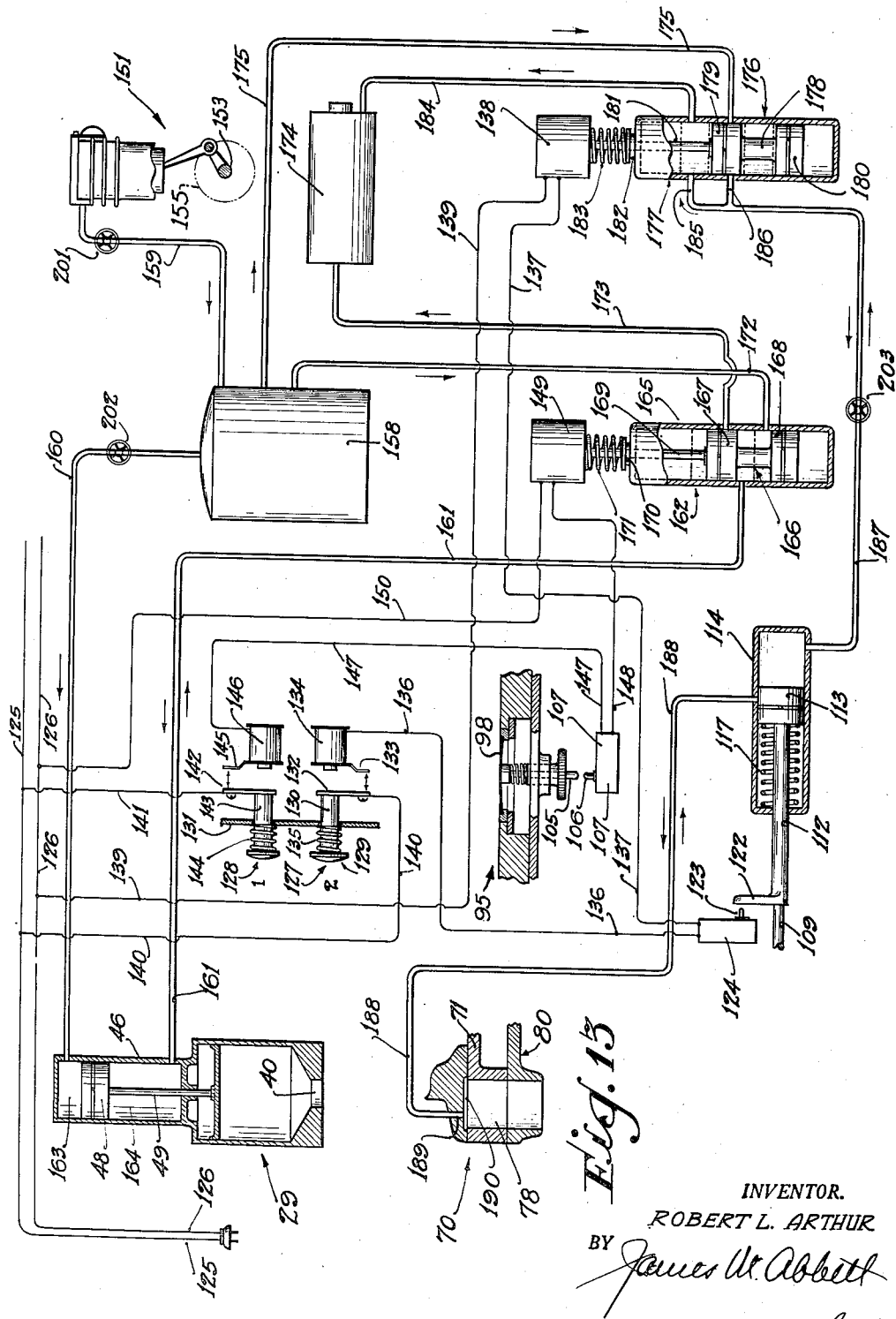

Patented July 10, 1951

2,559,840

UNITED STATES PATENT OFFICE 2,559,840

ICE CREAM DISPENSER

Robert L. Arthur, Ramona, Calif.

Application April 6, 1946, Serial No. 660,205

7 Claims. (Cl. 222—61)

1

This invention relates to a dispensing device, and particularly pertains to an ice cream dispenser.

It has been found that when a supply of ice cream is maintained in bulk so that individual servings can be removed therefrom that the operation of dispensing the ice cream is decidedly wasteful. This is due first to the fact that the bulk ice cream shrinks in volume, and furthermore, to the fact that when the ice cream is removed from the bulk supply by the use of a dipper there is a tendency for small particles of ice to form in the ice cream, and there is also the possibility that equal servings of ice cream will not be made. Furthermore, it should be pointed out that when ice cream is maintained in cans below the counter of a soda fountain or the like there is an opportunity for the ice cream to become contaminated and rendered unfit for use. This arrangement also makes it difficult for the heavy ice cream cans to be replaced easily. It is the principal object of the present invention, therefore, to provide a dispensing device for ice cream, which device may be conveniently mounted on the counter or the like, and within which device ice cream may be loaded in replaceable cartons, the structure being provided with feeding and measuring means whereby measured quantities of ice cream may be dispensed as desired and within which structure bulk ice cream may be maintained under refrigeration at a desired temperature.

The present invention contemplates the provision of a dispensing unit which may be placed on the counter of a soda fountain or the like, and which unit contains a compartment within which cartons or cartridges of ice cream may be placed and from which the ice cream may be dispensed, said unit including a self-contained refrigeration structure.

The invention is illustrated by way of example in the accompanying drawings in which:

Fig. 6 is a view in horizontal section as seen on the line 6—6 of Fig. 2 and shows the arrangement of the cartridge chamber.

Fig. 7 is an enlarged fragmentary view in the dispensing valve mechanism as seen on the line 7—7 of Fig. 5.

Fig. 8 is an enlarged fragmentary view through the dispensing valve as seen on the line 8—8 of Fig. 5.

Fig. 9 is an enlarged fragmentary view showing one of the dispensing valve controls as seen on the line 9—9 of Fig. 5.

Fig. 13 is an enlarged schematic view showing the flow plan of the air control for the dispensing mechanism.

Figure 1:
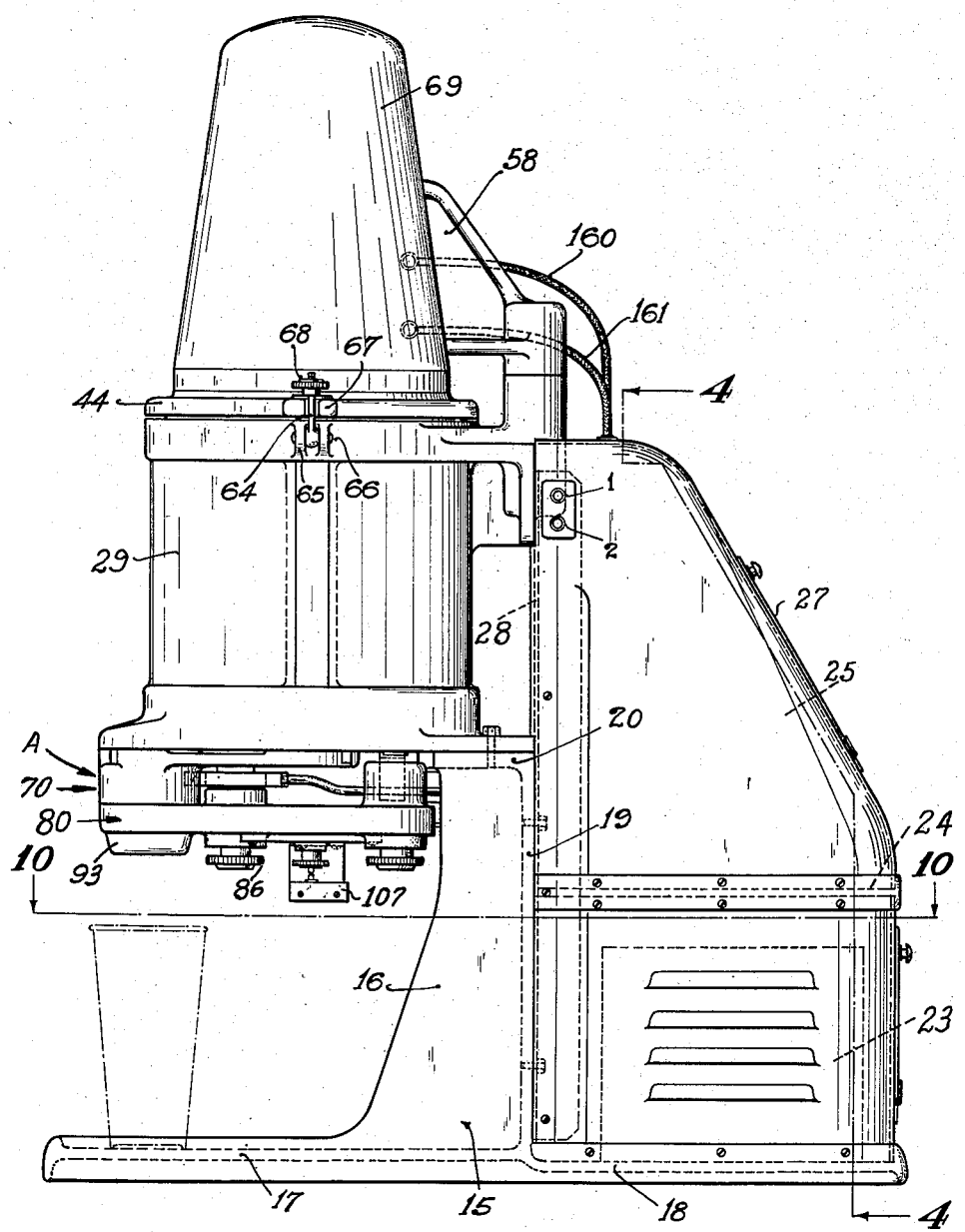
Figure 1 is a view in side elevation showing the complete dispensing unit with which the present invention is concerned.
Figure 2:
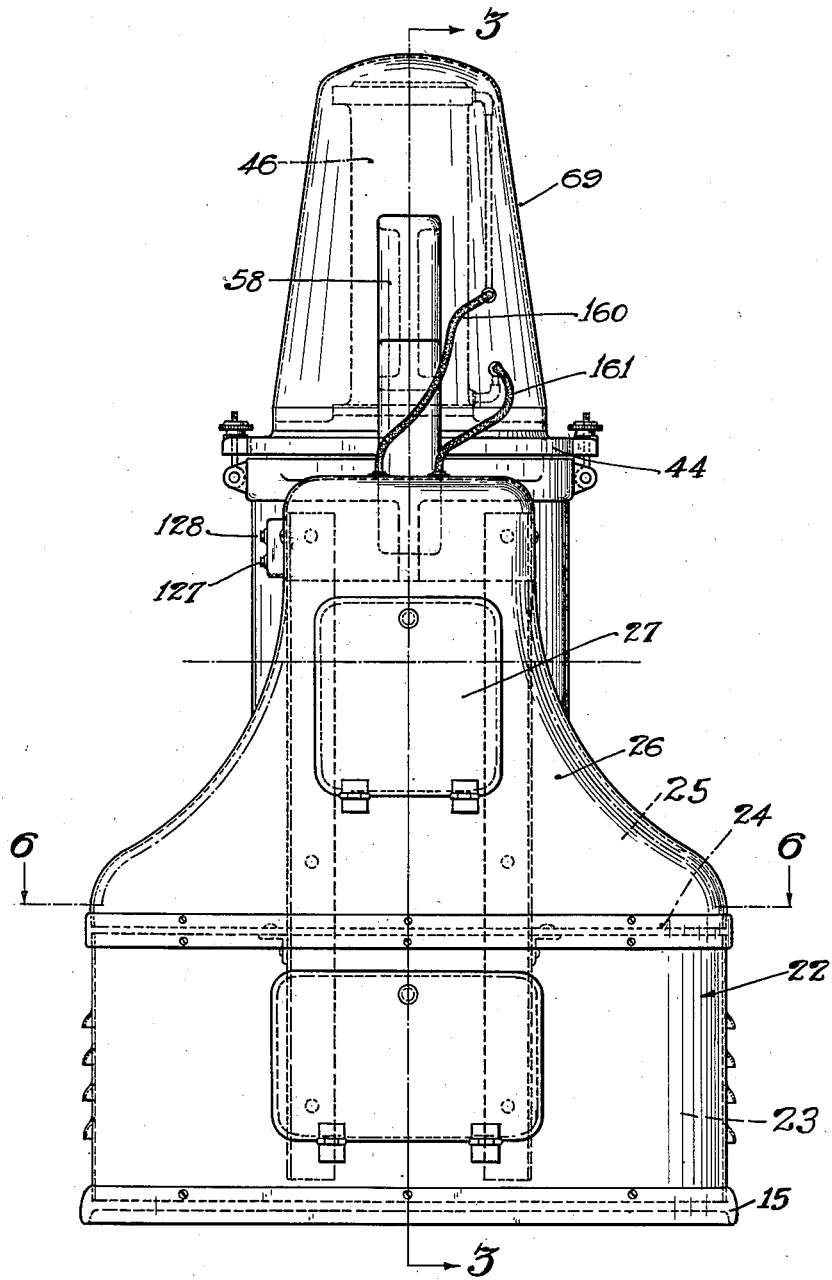
Fig. 2 is a view in elevation showing the back of the structure and the doors through wh'ch access is gained to the operating mechanism.
Figure 4:
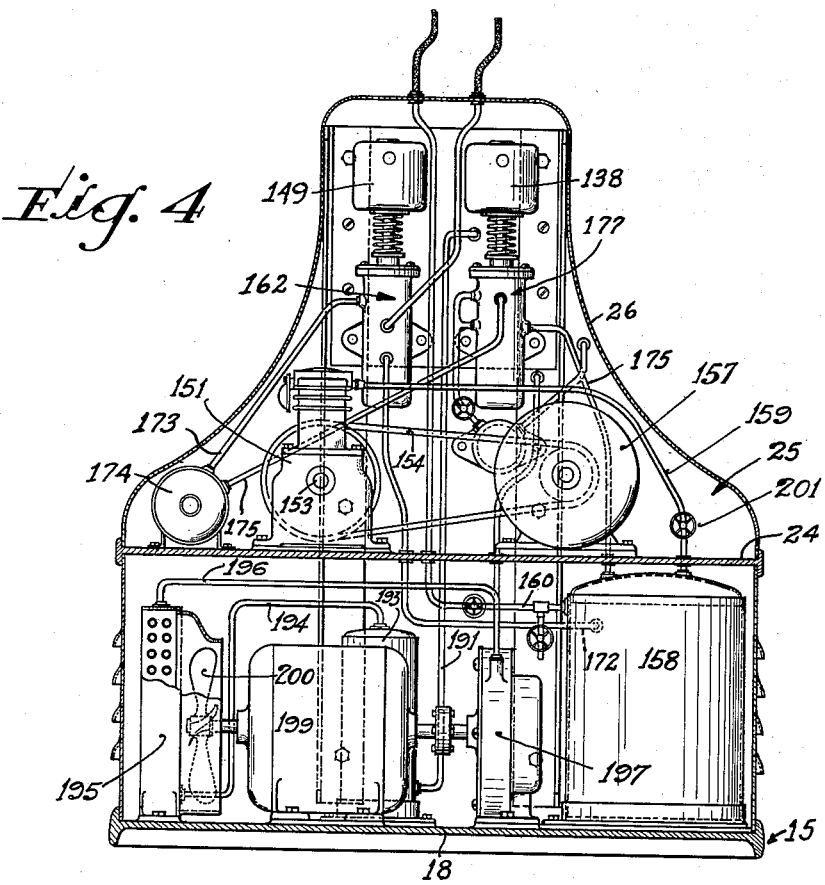
Fig. 4 is a view in vertical section and elevation as seen on the line 4—4 of Fig. 1 and shows the refrigerating unit, the air compressor unit, and the dispensing valve.
Figure 10:
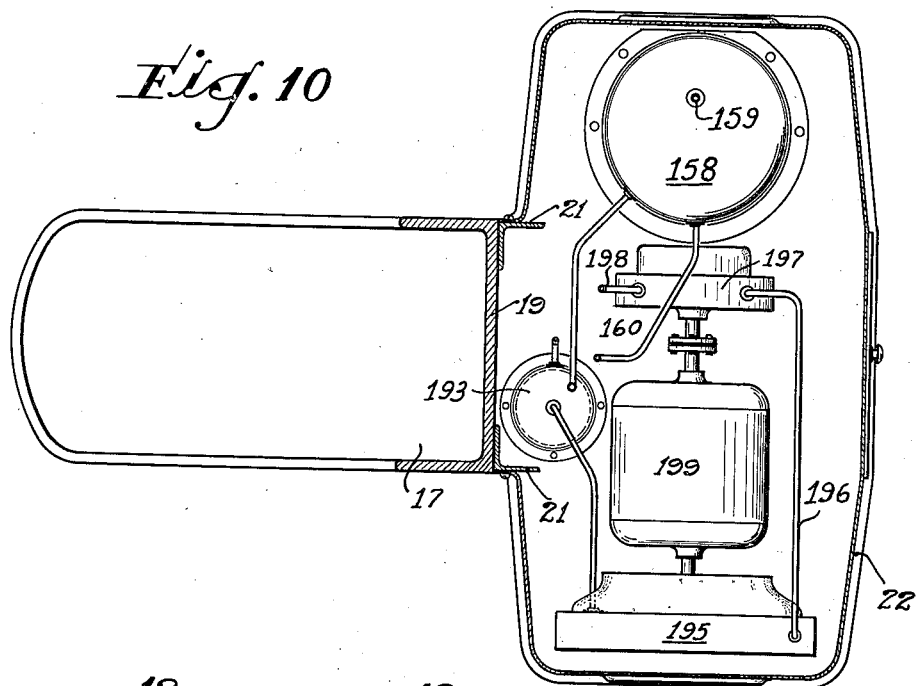
Fig. 10 is a view in horizontal section through the machine as seen on the line 10—10 of Fig. 1.
Figure 11:
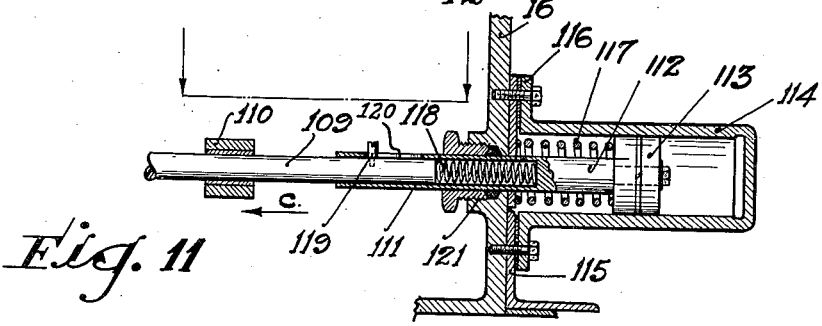
Fig. 11 is a view in horizontal section showing one of the control plungers as seen on the line 11—11 of Fig. 3.

Referring more particularly to the drawings, 15 indicates a base structure. This base is here shown as being formed of cast metal and includes a central upright 16 of horizontal channel section and oppositely extending platforms 17 and 18. The upright 16 is formed with a vertical bolting face 19 and a horizontal bolting face 20. The vertical bolting face 19 receives angle members 21, as shown in Fig. 10 of the drawing. These angle members provide a mounting for a housing 22. The base portion of the housing, as shown in Fig. 10, is substantially rectangular in horizontal cross-section and forms a compartment 23. A horizontal partition 24 is disposed at the top of the compartment 23 and forms the floor for an upper compartment 25. As shown in Figs. 1 and 4 the upper compartment is substantially triangular and is reduced in horizontal sectional area near its top. The upper compartment 25 extends a considerable distance above the horizontal plane of the bolting face 20. In its rear wall 26 a hinged door 27 is mounted. Opposite from the rear wall 26 a vertical wall 28 is provided.

Secured to the bolting face 20 of the upright 16 is an ice cream dispensing cylinder 29. This cylinder has an outer cylindrical wall 30 extending upwardly from a disc-like base 31. A central bore 32 is formed within the cylinder 29 and receives an outer lining member 33. Spaced from the lining member 33 and disposed concentrically within the same is a lining member 34. The lining members 33 and 34 cooperate to form an annular chamber 35 within which a refrigeration coil 36 is mounted. The chamber 35 extends down into an annular channel formed in the disc-like base 31 of the dispensing cylinder. The lining members 33 and 34 are held in spaced concentric relation to each other by a cover plate 37 which is secured around the top of the cylinder 30 and is formed with an annular projection 38 which fits within the annular space between the lining members 33 and 34. Attention is directed to the fact that the member 31 is formed with seats to accommodate the lower ends of the lining members 33 and 34, and that an annular shoulder 39 is formed along the inner circumference of the inner liner 34. The portion 31 has a central discharge opening 40. A frustoconical face 41 extends from the shoulder 39 to the discharge opening. It is intended that the annular face or shoulder 39 shall provide a rest for a tubular ice cream container 42 which may be introduced into the ice cream dispensing cylinder 29 when filled with ice cream and which may be removed when all of the ice cream has been discharged therefrom. It will be seen that the cover plate 37 is formed with a central opening 43 which agrees substantially with the outside diameter of the carton 42 and guides the carton downwardly into the dispensing chamber 29. A removable lid 44 is provided for the top of the cylinder 29 so that it will seal the compartment circumscribed by the lining member 34. A suitable sealing gasket 45 is disposed between the cover plate 37 and the lid 44. Mounted upon the lid 44 and disposed vertically and centrally thereof is a power cylinder 46. This cylinder is fastened to the top of the cover 44 by cap screws 47. The cylinder 46 receives a piston 48 and a piston rod 49. The piston rod 49 extends downwardly through the bottom plate 50 of the cylinder and then through a stuffing gland 51 to a piston 52. The piston 52 is designed to fit within the cylindrical carton 42 and to force the contents of the carton downwardly and to discharge such contents through the opening 40. The upper end of the cylinder 46 is closed by a cylinder head 53. Adjacent to the upper end of the cylinder head 53 and formed through the wall of the cylinder 46 is a port 54 through which a pressure fluid may pass from a conduit 55. Adjacent to the lower end 50 of the cylinder 46 is a port 56 which connects with a conduit 57. Formed integral with the cylinder 46 is a bracket 58. At the outer end of the bracket 58 is a boss 59 formed with a central vertical bore 60. Mounted within this bore is a pivot pin 61, the lower end of which is tubular and receives a helical spring 62. The pin and the spring are seated within a vertical bearing 63 which is here shown as being cast integral with the dispensing cylinder unit 29. It is intended that the spring 62 shall act to lift the bracket 58 and the cylinder 46 and also to allow the bracket 58 and the cylinder 46 to rotate around the vertical axis of the pin 61. This would permit the upper end of the dispensing cylinder 29 to be uncovered completely so that a cylindrical carton 42 might be placed within the cylinder or removed therefrom. The cover 44 is clamped in a sealing position over the mouth of the cylinder 30 of the dispensing unit by bolts 64 which are pivoted between lugs 65 upon pins 66. The upper ends of the bolts swing into the crotch formed by a fork 67 where they are tightened by nuts 68. In order to give the unit, comprising the cover 44 and the cylinder 46, a sightly appearance a frustoconical housing shell 69 is mounted over the cover and cylinder and is provided with an opening in its side to accommodate the bracket 58.

Figure 3:
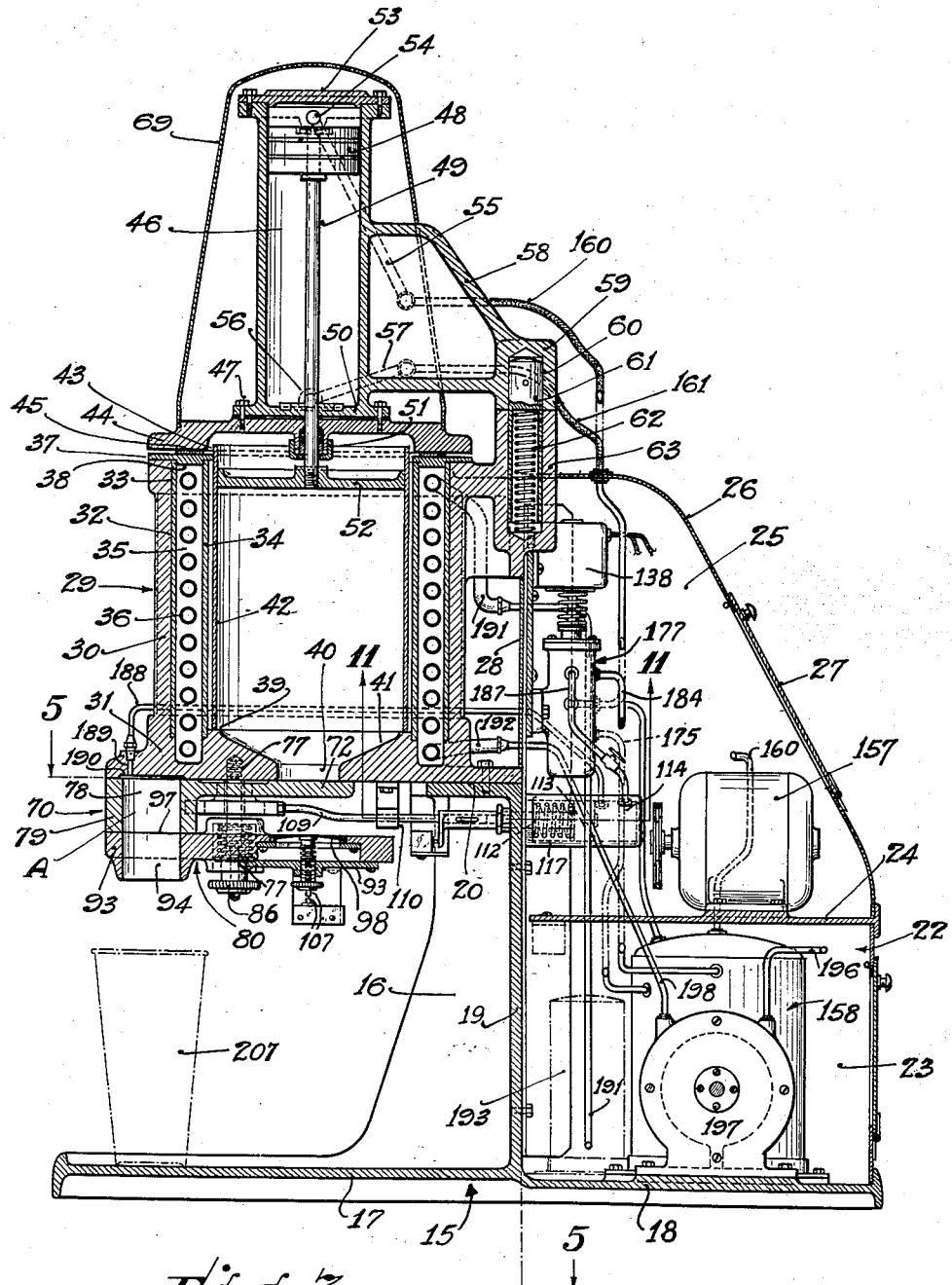
Fig. 3 is a view in central vertical section as seen on the line 3—3 of Fig. 2 and shows the arrangement of the complete operating mechanism with the measuring and dispensing valve in its discharge position.
Figure 5:
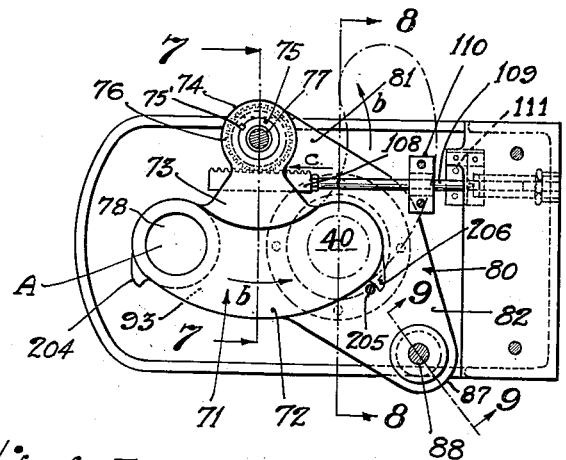
Fig. 5 is a view in horizontal section as seen on the line 5—5 of Fig. 3 and shows the structure of the dispensing valve.

Mounted beneath the disc portion 31 of the dispensing cylinder unit 29 is a valve structure generally indicated at 70. A view of the valve in vertical section is shown in Fig. 3 of the drawings, and a view of the valve in plan is shown in Fig. 5 of the drawings. The valve comprises an oscillating element 71. This comprises a flat arcuate portion 72 carried by an arm 73. The arm 73 is formed with a boss 74 through which the hub 75 of a gear 76 extends. The gear in turn is mounted upon a pivot pin 77, the upper end of which is threaded into the annular member 31. The arcuate length of the portion 72 of the valve structure 71 is sufficient to insure that when one end of the portion 72 covers the discharge opening 40 of the dispensing cylinder 30 the opposite end will be at a dispensing station A, indicated in Figs. 3 and 5 of the drawings. The end of the arcuate valve member 72 which moves to and from the dispensing station A is formed with a central opening 78 circumscribed by a downwardly extending side wall 79. The length of the side wall is selected to insure that the cylindrical bore 78 will have a columetric capacity to receive and dispense a desired serving of ice cream at each actuation of the machine. The cylindrical bore 78 and its surrounding side wall 79 will therefore be designated as the measuring cylinder. Mounted beneath the valve unit 70 is a secondary valve plate 80. This plate is formed with diametrically opposite extensions 81 and 82. The extension 81 has a bore through it to receive the pivot pin 7. A cup 83 is formed around this bore and receives a compression spring 84. The spring 84 circumscribes the lower end of the pivot pin 77. A washer 85 is mounted upon the lower end of the pivot pin 77 and forms a seat for the spring 84. A nut 86 is threaded onto the lower end of the pin 77 so that tension may be imposed adjustably upon the spring 84. This produces a sealing effect which will be hereinafter described. The wing 82 of the plate 80 is formed at its outer end with a boss 87 through which a pin 88 extends. This pin is threaded into the under face of the annular member 31 and extends downwardly through a cup 89 formed upon the member 82. A spring 90 is mounted within the cup 89 and circumscribes the pin 88. A washer 91 is mounted upon the lower end of the pin 88 and provides a seat for the spring. A nut 92 is threaded onto the end of the pin to give adjustable tension to the spring. By reference to Fig. 5 of the drawings, it will be seen that the central axes of the pins 77 and 88 are upon diametrically opposite sides of the central axis of the discharge opening 40. An extension 93 is formed as part of the plate 80 and coincides with the arcuate portion of the valve member 72 when its dispensing cylinder moves out to the dispensing station A. As shown in Fig. 3 of the drawings, the extension 93 of the plate 80 is formed with a vertical passageway 94 therethrough with which the vertical bore 78 of the valve element 70 registers when it has moved to the dispensing station A.

By reference to Figs. 3 and 8, it will be seen that the plate 80 carries a measuring unit 95 which is disposed in central vertical alignment with the discharge opening 40 of the dispensing cylinder 30 and in spaced relation therebeneath. Attention is directed to the fact that the upper face of the plate 80 is flat, as indicated at 96, and that it is held against the lower face 97 of the dispensing cylinder wall 79 by the action of the springs 84 and 90. Thus, the ice cream which is forced into the cylindrical bore 78 by the piston 52 will move over the surface 96 from a point beneath the discharge opening 40 to a point of register with the cylindrical discharge bore 94. In order to interrupt the downward movement of the piston 52 when the cylindrical bore 78 has been filled the measuring device 95 has been provided. This device comprises a flexible diaphragm 98, the circumferential edge of which is held in a mounting ring 98'. The mounting ring in turn is secured within a bore 100 formed through the plate 80 and with its axis coincident with the vertical center of the discharge opening 40 and the cylinder 30. The exposed area of the diaphragm agrees substantially in diameter with that of the bore 78 so that when the bore 78 is in register with the discharge opening 40 the diaphragm 98 will be directly therebeneath and will form a bottom for the bore 78. It will be obvious, therefore, that when the piston 52 moves downwardly to the point where it will have forced the cylindrical measuring bore 78 full of ice cream the diaphragm 98 will flex downwardly. As shown in Fig. 8, the diaphragm is normally flexed to present a convexed upper face to the ice cream. It is held in this position by a helical spring 101 which rests against an adjusting nut 102. The nut 102 is threaded into a boss formed as a part of a plate 103, and which plate is attached by screws 104 to the bottom face of the plate 80. Secured to the bottom face of the diaphragm 98 is an operating pin 105 which reciprocates through the nut 102. This operating pin is held out of engagement with a switch pin 106 by the spring 101. The switch pin 106 is a part of a switch unit 107 by which electric circuits to be hereinafter described are made and broken. The details of construction of the switch 107 need not be described since this may be any one of a number of switches designed to complete an electric circuit when the switch pin 106 is depressed, and which will break the circuit when pressure is relieved from the end of the pin 106.

The oscillating valve element 71 is moved by rotation of the gear 76, which is here shown as being formed integral with the hub 75 and as being keyed at 75' to the oscillating valve member 71. The gear 76 is in mesh with a gear rack 108. This rack is carried upon a horizontally disposed shaft 109 extending through a bearing 110 which is supported upon the member 31. The end of this shaft 109 extends into a central bore 111 of a piston rod 112. The piston rod 112 carries a piston 113 which is mounted within an air cylinder 114. The air supply system will be described hereinafter. The cylinder 114 is formed with a closed head at its outer end and with a sealing plate 115 at its inner end. This plate is interposed between an annular flange 116 of the cylinder and web 19 of the frame upright 16. A helical spring 117 is interposed between the piston 113 and the plate 115 and normally moves the piston outwardly within the cylinder. Attention is directed to the fact, however, that the length of the cylinder and the spring are such as to insure that the piston will normally stand midway the length of the cylinder, for a purpose to be hereinafter described. Interposed between the end of the rod 109 and the end of the bore 111 within which it reciprocates is a helical spring 118. This spring is thus interposed between the piston 113 and the rod 109 to provide a certain amount of lost motion. This motion is limited by a pin 119 which extends radially from the outer surface of the rod 109 and through a longitudinal slot 120 in the wall of the tubular portion of the piston 112. Attention is directed to the fact that the piston rod 112 extends through a packing gland 121 so that the cylinder 114 will be fluid sealed.

Figure 12:
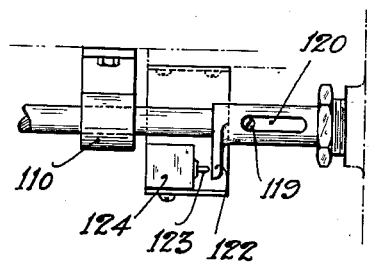
Fig. 12 is a fragmentary view in plan as seen on the line 12—12 of Fig. 11 and shows part of the valve operating mechanism.

By reference to Fig. 12 of the drawing it will be seen that a radially extending finger 122 is carried by the piston rod 112 at its outer end. This finger is intended to move into contact with a switch actuating pin 123. The pin forms a part of a make-and-break switch 124 which is of conventional design and is included in an electric circuit to be hereinafter explained.

The complete machine with which the present invention is concerned is operated and controlled by a combination of electrical and pneumatic means. The general arrangement of the operating elements is indicated by diagram in Fig. 13. Here it will be seen that electrical conductors 125 and 126 are provided to be connected to a suitable power source. Manually operated relay switches 127 and 128 are intended to control these circuits. The switch 127 comprises a push button 129 carried upon a pin 130 and reciprocably mounted through a suitable support 131. This support may be at any convenient spot on the machine and may form a part of a control box if desired. On the inner end of the pin 130 is a laterally extending switch arm 132 which may be moved to engage an electric contact 133 connected to one pole of a relay winding 134. A spring 135 is mounted upon the pin 130 and tends to restore the pin to its original and outermost position. The opposite pole of the relay coil 134 connects with a conductor 136 which leads to one side of the electric switch 124, previously described as being actuated by the member 122 on the piston rod 112. The opposite side of the switch 124 is connected to a conductor 137 which leads to one side of an electric solenoid 138. The opposite side of the solenoid 138 is provided with a conductor 139, which leads to the power supply line 126. It should be explained that a conductor 140 is connected at one end of the power supply line 125 and at its opposite end to the switch finger 132 carried upon the pin 130.

A conductor 141 is connected to the power line 125 at one end and leads to a switch blade 142 carried by a pin 143 of the manually operated relay switch 128. A spring 144 normally holds this switch open. The member 142 may be brought to engage a contact member 145 connected with one terminal of a relay coil 146. The other terminal of the relay coil 146 connects with a conductor 147 which leads to one side of the measuring switch 107. The opposite side of this switch is provided with a conductor 148 which leads to one side of a solenoid coil 149. The other side of this coil is provided with a conductor 150 which connects with the power feed line 126.

The pneumatic apparatus with which the present invention is concerned comprises an air compressor 151 of any desired construction and which is shown as being mounted upon the platform 24 within the upper housing portion 25 of the device. This compressor is provided with a pulley 152 carried by a driven shaft 153. A belt 154 passes around the pulley 152 and around a drive pulley 155 carried upon a shaft 156 of an electric driving motor 157. The motor circuit is not shown in the drawings, it being understood that the motor is automatically started and stopped by means associated with the pneumatic system. Mounted within the lower compartment 23 of the housing is an air receiving tank 158 which is connected to the air compressor 151 by a conduit 159. A supply line 160 connects the air tank 158 with the upper end of the power cylinder 46 through the pipe 55. Adjacent to the lower end of the dispensing cylinder 46 is the pipe 57 which connects with a pipe 161 which in turn is connected to a dispenser pilot valve 162. It has been explained that the power cylinder 46 is closed at its opposite ends save for an opening through which the piston rod 49 extends. Thus it will be noted that there will always be two closed compartments within the cylinder 46, one on each side of the piston 48, the upper one indicated at 163 and the lower one indicated at 164. The compression space 163 connects with the pipe 160 and the compression space 164 connects with the pipe 161, for purposes to be hereinafter explained.

The dispenser pilot valve 162 comprises a cylinder 165, which is closed at its opposite ends. A spool type piston 166 is mounted to reciprocate within the cylinder 165. This piston has spaced piston sections 167 and 168 and is secured to a valve stem 169, which is connected to the plunger of solenoid 149. Interposed between the solenoid 149 and a collar 170 on the piston rod 169 is a helical spring 171 which tends to maintain the valve 166 in the position shown in Fig. 13 of the drawings. It will be noted that when the valve is in this position the communicating opening of pipe 161 is uncovered by the piston section 167, and that this opening is adjacent to the lower edge of said piston section. It is also to be pointed out that when the valve 166 is in the position shown by solid lines in Fig. 13 of the drawings the opening through the cylinder wall to a supply pipe 172 will be uncovered. This opening is adjacent to the upper face of the piston portion 168. The pipe 172 communicates with the air tank 158. The cylinder 165 is also connected to a pipe 173. This pipe leads to a muffler 174 through which spent air is exhausted to the atmosphere without producing a disturbing noise. When the valve element 166 is in its normal position the piston portion 167 will close the opening to the pipe 173.

A supply pipe 175 is connected to the air tank 158 at one end and to a measuring pilot valve 176 at the other end. The measuring pilot valve comprises a cylinder 177 containing a spool-type piston valve 178. The valve member 178 includes piston sections 179 and 180 which are spaced from each other and are connected rigidly. A piston rod 181 is secured to the piston valve 178 and extends through the end of the cylinder 177. This rod is connected to a plunger of solenoid 138. The rod is formed with a collar 182 to receive one end of a helical spring 183 which is interposed between the collar and the solenoid. The normal position of the piston valve 178 is indicated by solid lines in Fig. 13 of the drawings. Here it will be seen that the supply pipe 175 extends through the wall of the cylinder 177 at a point which will be covered by the upper piston section 179. An exhaust pipe 184 connects with the cylinder 177 on a different transverse plane so that when the pilot valve is moved as the solenoid 138 is energized the pipe 184 will be closed. This pipe leads to the muffler 174. In the same plane of entry to the cylinder 177 as occupied by the ends of pipes 175 and 184 are pipe connections 185 and 186. These pipe connections are both attached to a pipe 187 which leads to the cylinder 114 adjacent to its end. This cylinder operates the dispensing valve structure 70. Piston 113 reciprocates within this cylinder and is held in a normal intermediate position by spring 117. As shown in Fig. 13 of the drawings, a pipe 188 connects with the cylinder 114 and leads to the base portion 31 of the dispensing cylinder 29 where it connects with a duct 189. The duct 189 is positioned so that the measuring bore 78 of the oscillating valve member 71 will register with it when in a dispensing position. A counterbore 190 is formed in the under-face of the member 31 at this point of register and is slightly larger in diameter than the bore 78. Thus, air from the duct 189 may fill the counterbore 190 and exert uniform air pressure over the upper exposed surface of the measured quantity of ice cream contained within the bore 78.

As has been previously explained, the dispensing cylinder 29 is supposed to be maintained under conditions of suitable refrigeration by the refrigeration coils 36. These coils are fitted with an upper pipe 191 and a lower pipe 192. The upper pipe 191 connects with a refrigeration fluid tank 193. A pipe 194 connects the tank 193 with the bottom of a cooling radiator 195. The top of this radiator is provided with a pipe 196 which connects to one side of a pump 197. The opposite side of this pump is provided with a pipe 198 which connects with the lower connection 192 of the refrigeration coil 36. A motor 199 drives the pump 197 and a radiator cooling fan 200.

In controlling the performance of the machine various manually operated valves may be provided, such for example as a hand valve 201 interposed in the line between the air compressor 151 and the air tank 158. A cut-off valve 202 may be placed in the line 160 and a cut-off valve 203 may be placed in the line 187.

In operation of the present invention the structure is constructed and assembled as here shown. Circuits for the motors 157 and 199 may be closed so that desired air pressure will be built up in the air tank 158 and so that the refrigeration unit may be at a proper degree of temperature. The nuts 68 on the bolts 64 may be loosened so that these bolts may be swung outwardly on their pivots 66 to clear the lug 67 formed as a part of the structure 44. When this takes place the cover structure, including the cylinder 46, will be released and the spring 62 will lift the entire structure and withdraw the piston 52 from within the cylinder liner 34. It will then be possible to swing the entire cover unit horizontally around the axis of the pin 61. This will render the upper end of the dispensing cylinder 29 accessible so that a cylindrical carton 42 of ice cream may be inserted in the central opening of plate 37 and moved downwardly within the cylinder 29 until its lower edge rests upon the shoulder 39. The cover structure may then be swung back into position over the top of the cylinder 29 and forced downwardly until it can be fastened by the bolts 64 and their nuts 68. When the plate 44 is forced downwardly to tighten the gasket 45 against the plate 37 the structure will be completely sealed at its upper end and the piston 52 will be in position within the upper end of the cylindrical carton wall 42. The button of switch 128 may then be depressed to bring the contacts 142 and 145 together. This will cause a circuit to be made from feed wire 125 through conductor 141 and contacts 142 and 145 to relay switch 146. The circuit will then be completed to include the conductor 147, the measuring switch 107 which is normally closed, the conductor 148, the solenoid 149, the conductor 150, and the feed wire 126. When this circuit is completed the relay magnet 146 will exert a magnetic action against the pin 143 and the arm 142 to energize the same and hold the members 142 and 145 in electrical contact. This will continue until the circuit is broken by the switch 107, as will be hereinafter explained.

Prior to the time the switch 128 is actuated the piston spool valve 166 will stand in the position shown in Fig. 13 of the drawings. In this position the piston will be balanced and will not move. This balancing is due to the fact that air from the tank 158 will pass through the pipe 160 to the space 163 in the cylinder 46. It will then act upon the upper end of the piston 48. However, air from the tank 158 is also passing through the pipe 172 to the cylinder 165 of the dispensing pilot valve 162. This air passes into the space between the piston sections 167 and 168 and flows through pipe 161 to the space 164 within the dispensing cylinder 46 to act against the opposite side of the piston 48. When, however, a circuit is made by closing the switch 128 the solenoid 149 will be energized to lift the piston 166 of the pilot valve 162 to the position indicated by dotted lines in Fig. 13. When in this position it will be noted that the pipe 161 will still communicate with the cylinder 165 but that the pipe 172 will be closed. Thus, the pressure upon the opposite sides of the piston 48 will be unbalanced so that the piston 48 may move downwardly. At the same time the air in the space 164 of the cylinder 46 will be displaced and will be forced through the pipe 161 into the cylinder 165 and thence through the pipe 173 to the muffler 174. It will be understood that the valve 71 is normally held with the bore 78 in register with the opening 40 in cylinder 29 and with a stop lug 204 in contact with a stop pin 205. The bore 78 will be in register with the opening 40 in the bottom of the dispensing cylinder 29 preparatory to discharge of ice cream from cylinder 29. The relay switch 127 is then closed. This will establish a circuit from the feed wire 125 to conductor 140 and thence through the arm 132 to the contact 133 and the relay magnet 134. The circuit then continues along conductor 136 through the normally closed switch 124, thence through conductor 137 to one side of the solenoid 138 of pilot valve 176. The circuit is then continued through conductor 139 to the feed wire 126.

By examination of Fig. 13 of the drawings, it will be seen that normally the pilot valve 176 stands with the pipe 187 in direct communication with the exhaust pipe 184 through the upper part of the cylinder 177. This makes it possible for the piston 113 to move freely within the cylinder 114 until the lug 204 strikes the stop pin 205 as shown in Fig. 5 and places the measuring bore 78 in register with the opening 40. When, however, relay switch 127 is closed it will remain closed due to the energization of the coil 134, and the piston 178 of the pilot valve 176 will be drawn upwardly to the dotted line position indicated in Fig. 13 due to the energization of solenoid 138. In this position air under pressure will be delivered from the air receiver 158 through the pipe 175 to the cylinder 177 and thence through pipe 187 to the cylinder 114.

The air delivered to the cylinder 114 will then move the piston 113 against the compression of the spring 117 and will force the rod 109 and the rack 108 in the direction of the arrow c, as shown in Fig. 5 of the drawings. This will cause the gear 76 to rotate and will swing the valve member 71 in a counter-direction from that indicated by arrow b and from the position indicated in dotted lines in Fig. 5 to the position indicated in solid lines. The limit of this swinging movement will be reached when the lug 206 contacts the stop pin 205. As the piston 113 reaches the end of its stroke two things take place. One is that the radial arm 122 on the piston rod 112 will engage the pin 123 of the switch 124 and will interrupt the circuit, which includes the relay coil 134 and the solenoid coil 138. When this takes place the spring 135 of the relay switch 127 will break the circuit between members 132 and 133 and the spring 183 will restore the piston valve 178 from its dotted line position to the solid line position shown in Fig. 13. It will be obvious that the movement of the arm 122 may continue after the lug 206 on the oscillating valve member 71 has encountered the stop pin 205. This is due to the telescopic connection between the rod 109 and the piston rod 112 together with the action of the spring 118. The second operation which takes place when the piston 113 has moved forwardly within the cylinder 114 is for the piston to uncover the port connecting with the pipe 188. This causes air to be delivered through the pipe 188 and the duct 189 to the counterbore 190 above the bore 78 in the oscillating valve member 71. The result will be that the ice cream which has been previously packed in the measuring bore 78 will be forced downwardly through the opening 94 and into a suitable receptacle 207. Attention is directed to the fact that in the sequence of operation of the machine here disclosed the discharge of ice cream from the carton 42 and into the measuring bore 78 takes place as a separate operation and is initiated by closing the relay switch 128. This operation is completed when the diaphragm 98 has been flexed downwardly to a point where the pin 105 will move the switch pin 106 to break the circuit through the switch 107. At that time the relay magnet 146 will be deenergized and the circuit will be broken between the members 142 and 145. When the circuit through the solenoid 149 is broken the spring 171 will restore the piston valve 166 to the position shown in Fig. 13 of the drawings and the fluid pressure on opposite sides of the piston 48 will be balanced again. At this time the measuring bore 78 will be filled and packed with ice cream so that when the operator closes relay switch 127 the measured quantity of ice cream may be removed from beneath the opening 40 and may be brought to register with the opening 94 through which it is discharged into the receptacle 207, as previously described.

It will thus be seen that by the structure here disclosed it is possible to place packages of bulk ice cream within a refrigerating unit and to thereafter dispense ice cream from said unit in measured quantities by a semi-automatic operation, which may be accomplished by the use of a relatively simple semi-portable dispensing unit which may be operated easily and efficiently.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. A machine for dispensing ice cream or the like comprising a dispensing cylinder within which a quantity of ice cream may be placed, said cylinder having a sealable opening at one end and a discharge opening at its opposite end, a piston operable through the sealable opening to force material through the discharge opening, a measuring and dispensing valve therefor comprising an oscillating valve arm adapted to swing in a plane normal to the axis of said discharge opening and thereacross and having an imperforate portion which may move to a sealing position over said opening and a measuring bore extending entirely through the depth of the valve arm, said valve arm being adapted to register alternately with the bore of the cylinder and a discharge station, said closure member and said measuring bore being so related that while the measuring bore is in registry with the opening in the cylinder the closure member registers with the discharge station and vice versa, means for oscillating said oscillating valve arm, power means for moving the piston in the dispensing cylinder, manually controlled means for initiating the operation of said power means, and means with which said measuring bore registers while in register with the discharge opening and acting when the measuring bore of the valve structure is filled to cause interruption of the operation of said power means.

2. The structure of claim 1 including means for ejecting the measured quantity of material from said measuring bore, and optionally controlled means for first causing the measuring chamber to move from a position in registry with the opening in the cylinder to a position in registry with the discharge station and for initiating said ejecting operation.

3. In combination with a dispensing cylinder having a discharge opening in its bottom, a measuring and dispensing valve therefor comprising an oscillating valve arm adapted to swing in a plane normal to the axis of said discharge opening and thereacross and having an imperforate portion which may move to a sealing position over said opening and a perforate portion formed with a measuring bore extending therethrough with its axis parallel to the axis of the discharge opening and being movable to register with said discharge opening, a diaphragm disposed beneath said oscillating valve arm and yieldably held thereagainst whereby an airtight seal will be formed between the oscillating valve arm and the end face of the cylinder and whereby the measuring bore will be closed at its lower end when in register with the discharge opening and will be opened at its lower end when at a discharge station, means normally holding the oscillating valve arm with its measuring bore in register with the discharge opening of the cylinder, pneumatic power means for moving said oscillating valve arm to place the measuring bore in register with the discharge station, manual means for initiating said movement of the oscillating valve arm, and pneumatic means associated with said power means and acting automatically to discharge the material from the measuring bore when said bore is in register with the discharge station.

4. In a dispensing machine for ice cream or the like, a dispensing cylinder having a discharge opening in its lower end and within which bulk ice cream may be placed, a piston within said cylinder adapted to force ice cream from said discharge opening when moved downwardly, a piston rod carried by the piston, a power cylinder into which the piston rod extends, an actuating piston secured on the upper end thereof and adapted to reciprocate within said power cylinder, pressure fluid connections at opposite ends of said power cylinder, a source of pressure fluid to which each of said connections is attached, fluid valve means interposed in one of said connections and acting normally to establish communication between the source of pressure fluid and the power cylinder and to be moved to interrupt said communication and permit the connection to vent to atmosphere, means tending to hold said fluid valve in its normal position, electrical means adapted to move the fluid valve from its normal position, an electric circuit including said electrical means, a manually operable relay switch in said circuit to close the same and to hold the circuit in its closed position, a receptacle support disposed beneath the discharge opening of the dispensing cylinder, a receptacle moving thereover, a normally closed switch included in the aforesaid circuit and carried by said support, and means associated with said support whereby said normally closed switch will be opened when the receptacle has been filled thereby breaking the electric circuit including the relay switch.

5. In a machine for dispensing ice cream or the like, a dispensing cylinder within which a supply of ice cream may be placed in bulk, said cylinder having a discharge opening in its bottom wall, an oscillating valve member pivotally mounted upon the base of said bottom wall and adapted to swing across said opening, said oscillating valve member being formed with an arcuate plate, the upper face of which rests against the lower face of the bottom wall of the cylinder, the plate being imperforate substantially throughout its arcuate length and being formed at one end with a measuring bore into which a desired quantity of ice cream may be filled from said dispensing cylinder, the axis of which is parallel to the axis of the discharge opening and the diameter of which agrees substantially in diameter with that of the discharge opening, the bore being open at its opposite ends and its depth being sufficient to allow a predetermined quantity of material from the dispensing chamber to fill the bore, a sealing plate disposed beneath said oscillating valve member and against which its lower face rests, and yieldable means exerting pressure against said oscillating valve member whereby a seal will be formed between the upper face of the oscillating valve member and the bottom face of the dispensing cylinder and between the lower face of the oscillating valve member and the upper face of the sealing plate.

6. A dispensing machine for ice cream or the like comprising a vertically disposed dispensing cylinder within which a cylindrical carton of ice cream may be placed, both ends of said carton being open, a discharge opening at the lower end of said cylinder and through which ice cream may be forced, a removable head structure adapted to be mounted over the top of said cylinder, said head structure carrying a power cylinder, a piston therein and a discharge piston connected to the piston within the cylinder adapted to fit within the carton from which material is to be forced, an oscillating valve mounted at the lower end of said cylinder and pivoted to swing across the mouth of the discharge opening, said valve having a perforate portion normally closing the discharge opening and a measuring bore of a capacity to receive a desired quantity of ice cream to be dispensed, a plate fixed below said oscillating valve and having a discharge bore therethrough with which the measuring bore may be moved to register when filled, a diaphragm carried by said plate in alignment with the discharge opening and with which the measuring bore may register when being filled, an air receiving tank, conduits connecting said tank to the opposite ends of the power cylinder, a valve structure interposed in the line of said conduits from the air receiving tank to the power cylinder whereby air normally flows to both sides of the power cylinder, solenoid actuating means for said valve adapted to establish communication with the atmosphere whereby the cylinder may be moved downwardly, an electric circuit for said solenoid, a relay switch disposed in said electric circuit, which switch may be manually closed to initiate operation of the solenoid, a second switch normally closed and included in said circuit, means whereby the deflection of the aforesaid diaphragm will open said normally closed switch and permit the fluid valve to return to its normal position after a desired quantity of ice cream has been filled into the measuring bore, and means for moving the measuring bore of the oscillating valve from its position in register with the discharge opening of the cylinder to a position in register with the opening in the plate beneath the valve.

7. In a machine for dispensing ice cream or the like in which a vertical cylinder is provided having a discharge opening in its lower end and from which cylinder ice cream may be forced by extrusion, a valve control structure comprising an oscillating valve of arcuate shape, means pivotally mounting said valve at the lower end of the dispensing cylinder, said oscillating valve being mounted at the lower end of the cylinder and pivoted to swing across the mouth of the discharge opening, said valve having a perforate portion normally closing the discharge opening and a measuring bore of a capacity to receive a desired quantity of ice cream to be dispensed, pneumatically actuated means for oscillating said valve from a position where the measuring bore will be in register with the discharge opening of the cylinder to a position where the material may be discharged therefrom while the imperforate end of the valve closes said discharge opening, a source of fluid under pressure, a conduit connecting said source with the valve operating device, a solenoid operated pilot valve disposed at a point in the length of said conduit, an electric circuit including said pilot valve, a manually set relay switch in said circuit whereby the circuit will remain closed during the period of operation, a normally closed switch in said circuit, and means associated with the valve actuating means to open said circuit when the valve has moved to a discharge position thereby permitting the fluid valve to be restored to its original closed position.

ROBERT L. ARTHUR.

REFERENCES CITED

The following references are of record in the file of this patent:

UNITED STATES PATENTS

| Number | Name | Date |
| --- | --- | --- |
| 676,130 | Goodfellow | June 11, 1901 |
| 1,529,918 | Richards | Mar. 17, 1925 |
| 1,609,015 | Engbrecht | Nov. 30, 1926 |
| 1,685,250 | Key | Sept. 25, 1928 |
| 1,799,755 | Loughbridge | Apr. 7, 1931 |
| 2,263,794 | Wyen | Nov. 25, 1941 |